May 11, 1965   H. KWIATKOWSKI   3,182,765
CORRUGATED STRUCTURE
Filed May 29, 1961   5 Sheets-Sheet 1

INVENTOR.
Herbert Kwiatkowski
BY *Spencer & Kaye*
ATTORNEYS

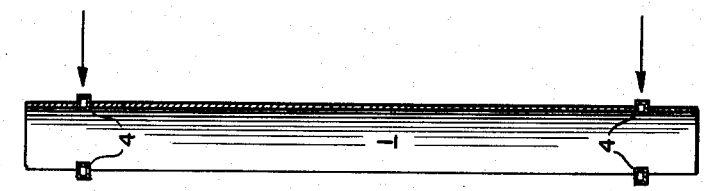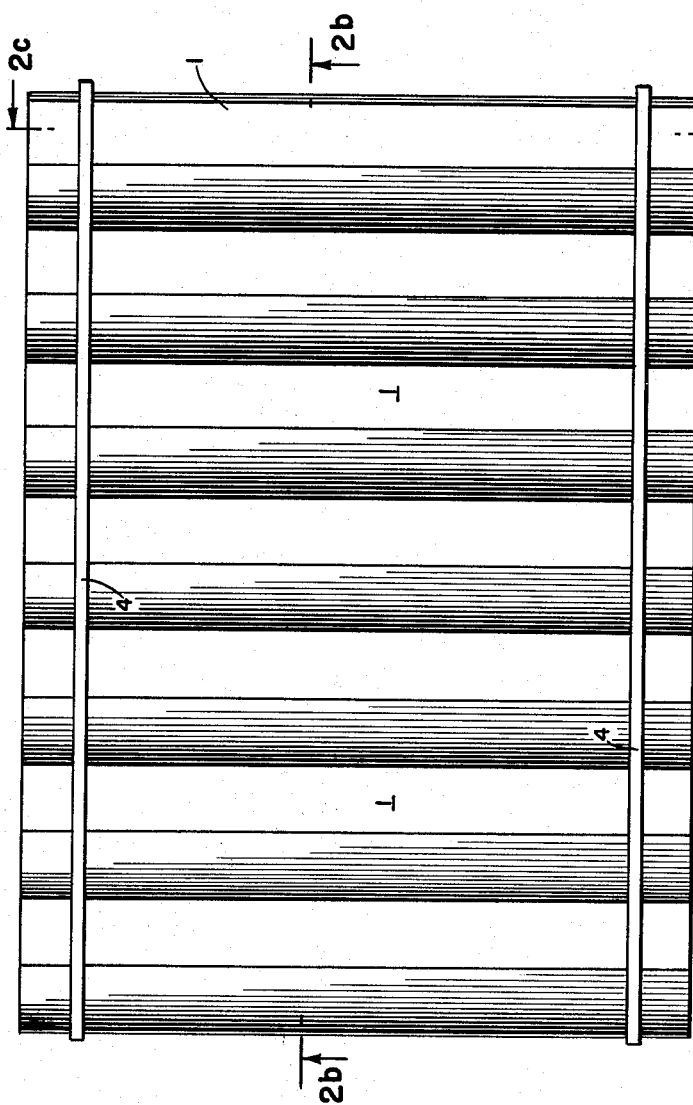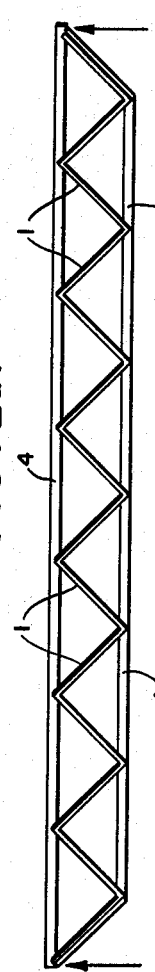

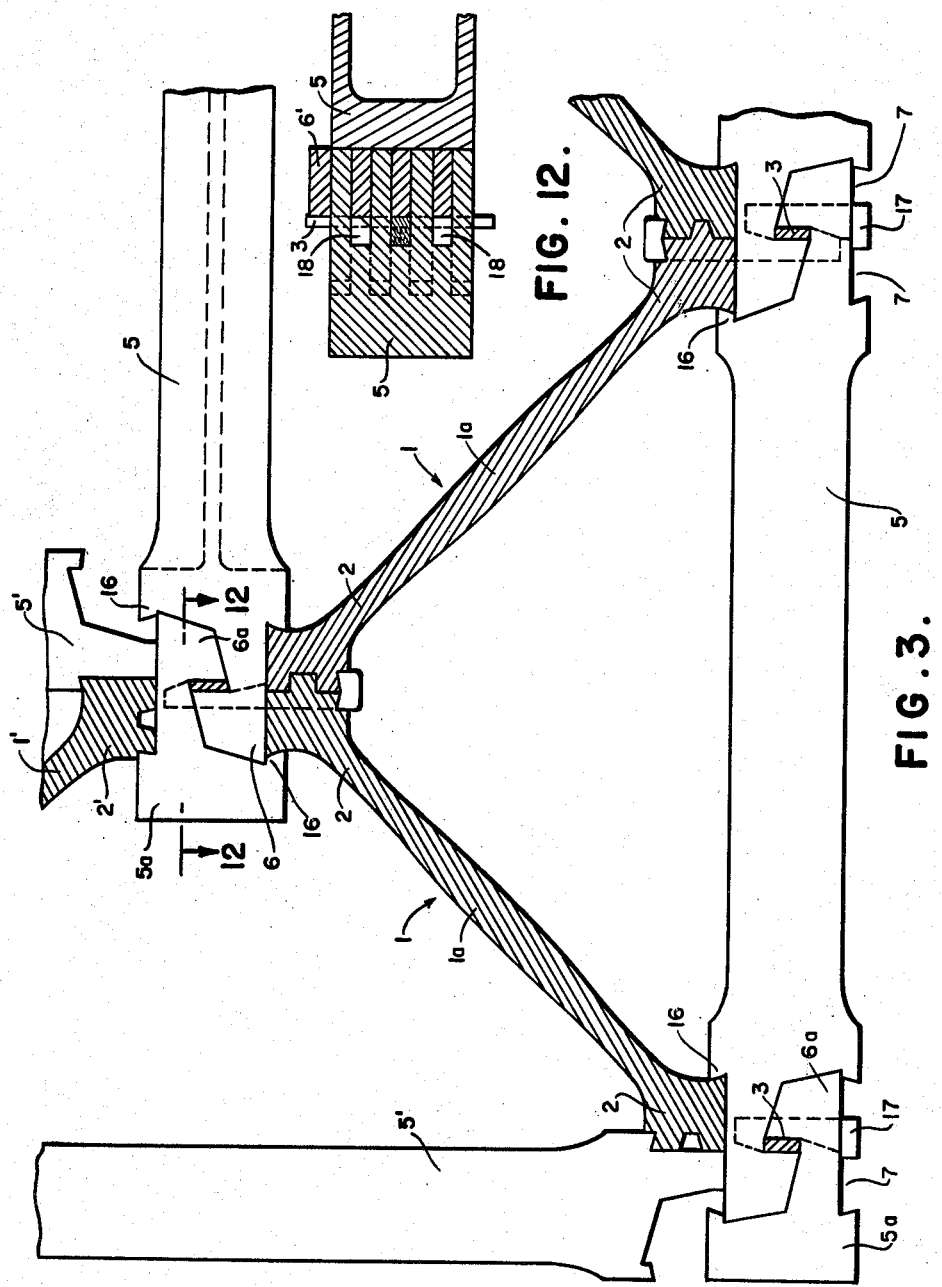

May 11, 1965 H. KWIATKOWSKI 3,182,765
CORRUGATED STRUCTURE
Filed May 29, 1961 5 Sheets-Sheet 4

INVENTOR.
Herbert Kwiatkowski
BY Spencer & Kaye
ATTORNEYS

May 11, 1965 H. KWIATKOWSKI 3,182,765
CORRUGATED STRUCTURE
Filed May 29, 1961 5 Sheets-Sheet 5

INVENTOR.
Herbert Kwiatkowski
BY *Spencer & Kaye*
ATTORNEYS

United States Patent Office 3,182,765
Patented May 11, 1965

3,182,765
CORRUGATED STRUCTURE
Herbert Kwiatkowski, Erzbergerstrasse 42,
Stuttgart-Nord, Germany
Filed May 29, 1961, Ser. No. 113,402
13 Claims. (Cl. 189—34)

The present invention relates to a corrugated structure, particularly to the manufacture of a unit usable as a ceiling, a wall, and a roof.

It is the basic object of the instant invention to provide a corrugated construction which is cantilevered or self-supporting in two directions. According to the present invention, this is accomplished by providing chords on both sides of the plates which make up the corrugated structure, spaced given distances apart, with corresponding chords lying opposite each other and at right angles to the longitudinal edges of the plates, and the chords being positively and detachably connected with the plates.

This has the advantage over heretofore known corrugated constructions, which must be supported on all sides, that, taking for example a ceiling construction, the unit has to be supported only at its four corners.

The corrugated construction is suited for building high structures of any desired floor plan, in minimum time, and with a minimum of simple parts.

More particularly, the present invention resides in a corrugated structure which comprises a plurality of inclined plates connected to each other at their longitudinal edges in zig-zag configuration, and chord means incorporating a plurality of spaced-apart pairs of chords arranged at right angles to the longitudinal edges and being positively and detachably connected thereto, the chords of each pair being arranged opposite each other on the opposite sides of the corrugated structure.

Additional objects and advantages of the present invention will become apparent upon consideration of the following description when taken in conjunction with the accompanying drawings, in which:

FIGURE 1 is a perspective view of a corrugated structure according to the present invention.

FIGURES 2a, 2b, and 2c are, respectively, a plan view, a transverse sectional view taken on line 2b—2b of FIGURE 2a, and a longitudinal sectional view taken on line 2c—2c of FIGURE 2a.

FIGURE 3 shows the interengagement of finger-like claws when the ends of the chords are rectilinear and branched continuations.

FIGURE 12 is a sectional view taken on line 12—12 of FIGURE 3.

Figure 5:
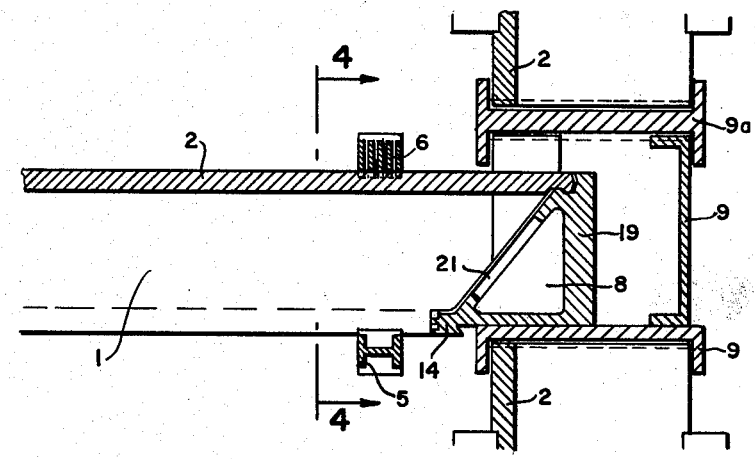
FIGURE 5 is a sectional view taken on line 5—5 of FIGURE 4.
Figure 6:
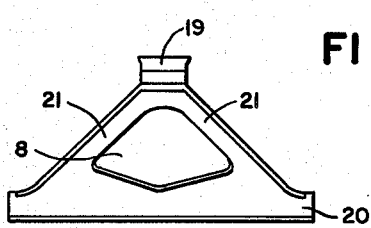
FIGURE 6 is a plan view of the supporting frame shown in FIGURES 4 and 5.

Referring now to the drawings and to FIGURES 1, 2a, 2b, and 2c thereof in particular, there is shown a corrugated construction comprising inclined plates 1 which have reinforced midportions 1a and which are connected together at their longitudinal edges in zig-zag configuration. The connection is effected by means of longitudinal chords 4 which are arranged opposite each other in pairs and which extend at right angles to the longitudinal edges of the folded unit. The chords 4 are positively and detachably connected to the plates 1. As shown in FIGURE 5, the chords comprise longitudinal sections or straps 5 whose ends 6 are fashioned as claws which may be dug into the plates 1 and placed under stress by means of wedges.

FIGURE 3 shows such toothed engagement and stressing of the straps 5 when the chords 4 extend rectilinearly and at right angles, or when they branch off.

When the claw-like ends 6 of the straps 5 are attached, they are so positioned that the inner surfaces of the claws, which after the assembly is completed abut the wedge 3, are close together. In this position, the distance between the noses 16 of the claws to be interconnected is at its greatest; consequently, the dove-tail recesses 7 present their maximum inner width. In the illustrated position, the front surfaces of the finger-like claws can readily slide past the opposite claw. Inasmuch as the dove-tail recess 7 resulting from the position of the noses 16 will have its maximum inner width when the inner surfaces of the claws are in direct contact, the toothed and enlarged longitudinal edges of two adjacent plates 1 can be introduced into this dove-tail recess 7.

The finger-like claws 6 of the straps 5 to be joined are then slid along each other. The inner surfaces of the claws will thus move apart. This results in a space for the wedge 3. The front surfaces of the claws at the level of the noses 16 closely abut each other in the counter bearings. The enlarged longitudinal edges 2 of the two abutting plates which are grasped by the two assembled claws will then be firmly clamped when the wedge 3 is introduced. When the wedge is driven in place, the wedge clamps 17, which were previously inserted, will be drawn together. The finger-like claws will now be held together in such a manner that the junction point will be firmly clamped together without there being any play between the various parts.

The clamping junction is released simply by knocking the wedge 3 out of its position between the inner surfaces of the claws.

FIGURES 3 and 12 show how corner and branch connections are effected. The plates 1 together with straps 5 pertain to a plate set extending in one direction (depicted as horizontal in FIGURE 3) while the plate 1' is the first of a second plate set, equipped with straps 5', extending at right angles to the first plate set (depicted as vertical in FIGURE 3). Each joint includes an end piece 5a which is, in effect, simply the end portion of a strap. This end piece 5a coacts with a respective strap 5, i.e., the claw 6a engages the claw 6, so as to hold the edges 2 of the two plates 1. Thus, the strap 5 and the end piece 5a coact in the same manner as two straps 5 which hold the edges 2 of two plates 1 neither of which is at the end of a plate set (see, for instance, the lower right-hand portion of FIGURE 3).

The fingers of claw 6' of strap 5 (FIGURE 12) are introduced into the spaces 18 formed between the fingers of claw 6a of end piece 5a, the claw 6' thus being displaced by a distance equal to the width of one finger with respect to the enterengaged claws 6, 6a. The wedge 3 will, in such a joint, serve to secure the straps 5 and 5' together with the end piece 5a.

Figure 1:
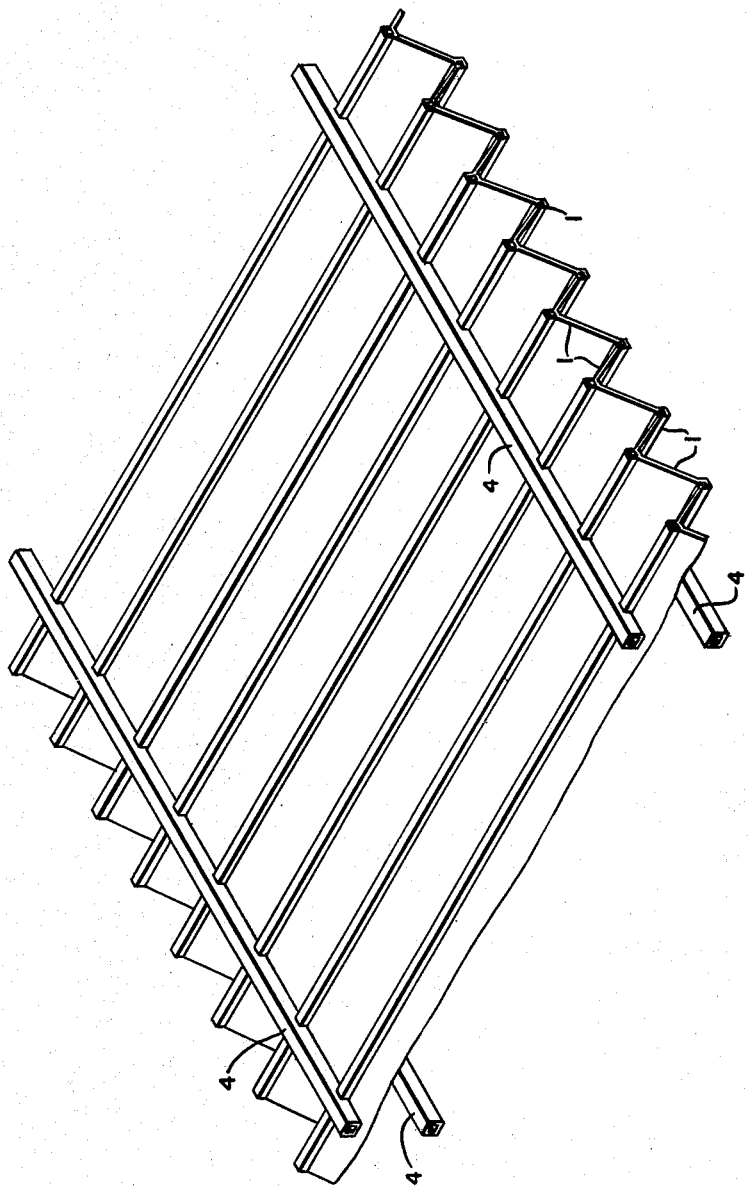
Figure 4:
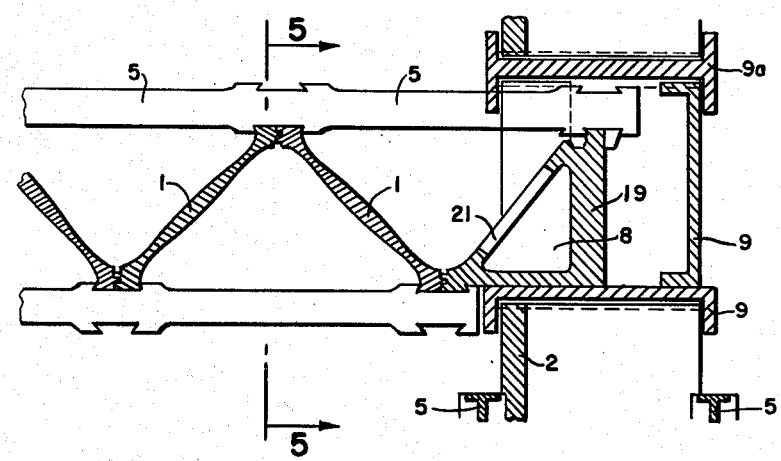
FIGURE 4 is a sectional view taken on line 4—4 of FIGURE 5 and shows the corrugated structure inserted into a wall by means of a supporting frame having the shape of a right triangle.
Figure 7:
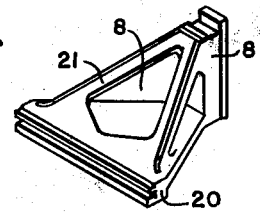
FIGURE 7 is a perspective view of the supporting frame of FIGURE 6.

The ceiling structure of FIGURE 4 is shown in a section parallel to the main support system, and extends into the wall by means of a supporting frame 8. The reinforcing web 21, shown in FIGURES 4, 5, and 7, serves to take up the end pushing forces of the main support system. The web 21 also serves, as can be seen from FIGURE 5, to support the end or to form the end face connection of the enlarged longitudinal edges of the plate 1. The tip of the boss portion 8 has a conical profile at the supporting portion 19 as well as at the base edge 20, to allow the clamping of the finger-like claws 6 of the straps 5.

Figures 8, 9:
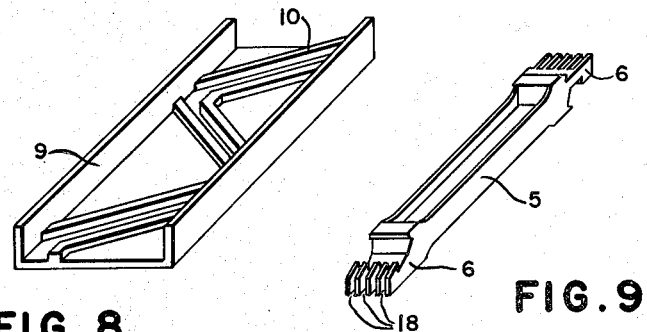
FIGURE 8 is a perspective view of a beam incorporated in the structure of FIGURES 4 and 5.
FIGURE 9 is a perspective view of a chord section or strap incorporated in the structure of FIGURES 4 and 5.

A bar 9 provided with profiled rods 10, and closing the vertically oriented enlarged longitudinal edges 2 of the plates 1 as a base or cover plate (wall, window molding, door frames, and the like), makes possible a vertical clamping of the parts of consecutive stories if the bar is of such length as to span more than one story. This type of clamping may, under certain circumstances, be necessary to multiple story structures due to the low weight of the corrugated construction proper. The bar 9 may have a channel or U-shaped cross section, as shown in FIGURE 9, or two such bars may be combined into a composite member 9a of I-shaped cross section, as shown at the top of each of FIGURES 4 and 5.

Figure 10:
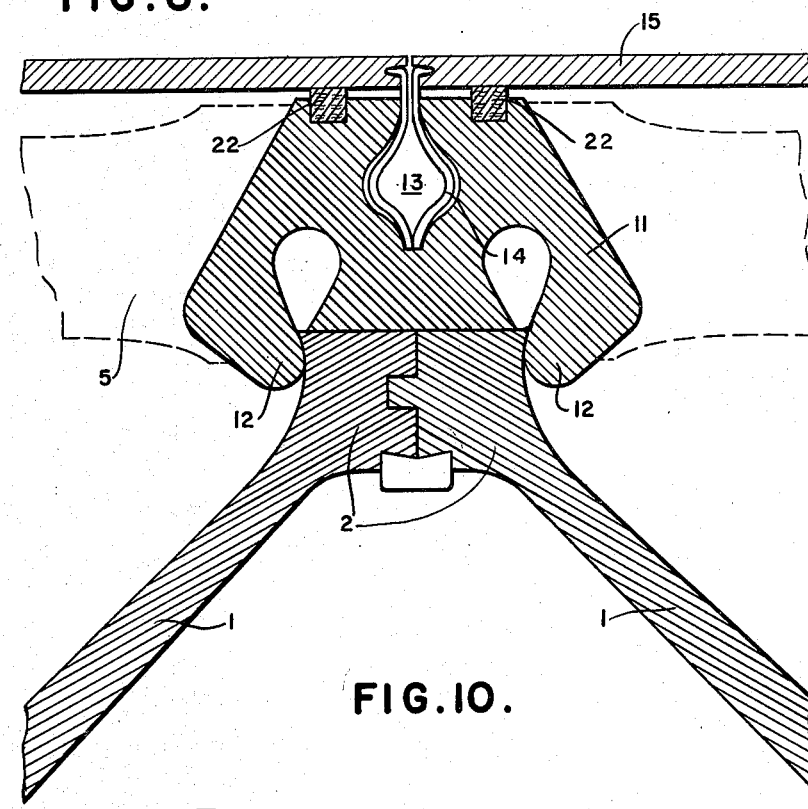
FIGURE 10 is a clamp used as a connector between the corrugated structure and the facing of the plate.
Figure 11:
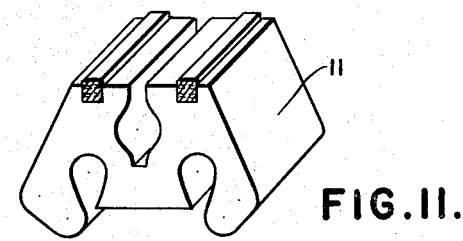
FIGURE 11 is a perspective view of the clamp shown in FIGURE 10.

When the corrugated construction and the plate lining are connected to each other as shown in the arrangement of FIGURE 10, the resilient jaws 12 of clamp 11 slide over the enlarged longitudinal edges 2 of two adjacent plates 1 which edges 2 are connected together by the tongue and groove joint. The side walls of these thickened or enlarged edges 2, along which the jaws slide, are tapered. Consequently, the elastic abutment of the jaws brings about a clamping effect between these enlarged edges 2. The cork rods 22 cushion the lining plates 15, which are urged against the clamp 11 by leaf springs 14 which are inserted into an oval cutout 13.

While in known corrugated constructions the unit is rigid in but one direction, the corrugated unit according to the present invention is rigid in two directions. Consequently, the unit according to the present invention has many more applications than the heretofore known units.

In order to obtain smooth upper surfaces and in order also to improve the weather-proof, heat-proof, and sound-proof characteristics of the unit, it is recommended that the unit be lined with thin plates. This forms hollow spaces which can be utilized to accommodate conduits of various sorts, so that it becomes very simple to move the entire unit.

The structure can be made of metal, or of any plastic of suitable strength.

The above-described unit can be supported at its four corners. The rigidity and stability of the unit, in comparison to the amount of material used, is very high.

The particular advantage of the instant invention is the simple mounting and dismounting. This is especially important because it allows the use of unskilled labor. Also, it then becomes very simple to disassemble a structure and to rebuild it with a different floor plan.

Other advantages are the lightness of the unit, the use of a low number of basic elements, and the fact that the unit can be supported in many possible ways.

It will be understood that the above description of the present invention is susceptible to various modifications, changes, and adaptations, and the same are intended to be comprehended within the meaning and range of equivalents of the appended claims.

What is claimed is:

1. A corrugated structure comprising, in combination: a plurality of inclined plates having longitudinal edges and connected to each other at their longitudinal edges in zigzag configuration; and chord means incorporating a plurality of spaced apart pairs of chords arranged at right angles to said longitudinal edges and being positively and detachably connected thereto, the chords of each pair being arranged opposite each other on the opposite sides of the corrugated structure, each of said chords comprising a plurality of straps of a length equal to the distance between joined plate edges on the same side of the structure, each strap having at its ends finger-like claws which are interengaged with each other and with corresponding plates; said straps forming, in the region of their interengaged claws, recesses which receive the connected together longitudinal edges of said plates, said recesses and said connected together longitudinal edges having mating shapes such that said edges are at first received in said recesses with play but that, upon wedging, there will be formed the positive connection between said straps and said plates.

2. A corrugated structure as defined in claim 1 wherein said mating shapes are of dove-tail configuration.

3. A corrugated structure as defined in claim 1 wherein said ends of said straps and said plates are clamped together by means of a wedge.

4. A corrugated structure as defined in claim 1, wherein said claws are spaced from each other, there being an additional strap extending at right angles and projecting into the space between said claws.

5. A corrugated structure as defined in claim 1 wherein the plates which are inclined toward each other have a reinforced midportion, and wherein one of the edges of said plates has a groove and the other a tongue.

6. A corrugated structure as defined in claim 1 wherein an endface member for said plates is provided, said member being a profiled bar at the inner surfaces of which straps are carried and being provided with grooves for receiving said plates.

7. A corrugated structure as defined in claim 6 wherein said bar is of U-shaped cross section.

8. A corrugated structure as defined in claim 6 wherein said bar is of I-shaped cross section.

9. A corrugated structure as defined in claim 1 wherein a frame member for the ends of said chords is provided.

10. A corrugated structure as defined in claim 9 wherein said frame member has the shape of a right triangle.

11. A corrugated structure as defined in claim 10 wherein that side of said frame member which is directed toward said chords is profiled so as to be adapted to receive said chords.

12. A corrugated structure as defined in claim 1, further comprising clamp means secured to said chords, a facing, and spring means for securing said facing to said clamp means.

13. A corrugated structure as defined in claim 12, wherein said spring means are arranged in oval recesses of said clamp means.

References Cited by the Examiner

UNITED STATES PATENTS

| | | | |
|---|---|---|---|
| 900,378 | 10/08 | Jackson | 189—34 |
| 1,347,084 | 7/20 | Eggleston | 20—0.5 |
| 1,365,059 | 1/21 | Picirilli | 189—34 |
| 1,874,572 | 8/32 | Montgomery | 189—34 |
| 2,027,288 | 1/36 | Prielipp | 61—60 |
| 2,312,994 | 3/43 | Weitzel | 189—34 X |

OTHER REFERENCES

Germany, K16305V/37b, October 1955.

HARRISON R. MOSELEY, *Primary Examiner.*

JOEL REZNEK, *Examiner.*